United States Patent [19]
Kitai

[11] 3,722,392
[45] Mar. 27, 1973

[54] CAMERA SHUTTER WITH NOVEL OPERATING MECHANISM

[75] Inventor: Kiyoshi Kitai, Tokyo, Japan

[73] Assignee: Kabushiki Kaisha Hattori Tokeiten, Tokyo, Japan

[22] Filed: June 7, 1971

[21] Appl. No.: 150,612

[30] Foreign Application Priority Data

June 5, 1970 Japan ..................................45/48047

[52] U.S. Cl. ......................95/62, 95/10 CE, 95/53 EB
[51] Int. Cl. ................................................G03b 7/08
[58] Field of Search..95/10 C, 10 CT, 53 EA, 53 EB, 95/62, 63

[56] References Cited

UNITED STATES PATENTS

| 3,502,011 | 3/1970 | Reutschler et al. | 95/10 CT |
|---|---|---|---|
| 3,356,004 | 12/1967 | Kiper | 95/6 B |
| 3,251,288 | 5/1966 | Kitai | 95/62 |
| 3,474,716 | 10/1969 | Wurster | 95/62 |

Primary Examiner—Joseph F. Peters, Jr.
Attorney—Robert E. Burns and Emmanuel J. Lobato

[57] ABSTRACT

A camera shutter operating mechanism controlled by a light-responsive control circuit and having a retarder retarding the opening of the shutter blades by a blade-operating lever driven by a driving lever and configured as a sector gear at one end driving a retarder gear coactive with a gear of an escapement having an anchor jointly functioning as the retarder. The driving lever is pivotally mounted intermediate a free end of the operating lever and the sector gear thereon. A drive spring biases the driving lever in a direction for effecting opening and closing of the shutter blades. A pawl is attracted by an electromagnet of the control circuit and this pawl restrains the free end of the driving lever during part of the period of rotation of the driving lever while the shutter blades are being opened and thereafter the driving lever rotates the shutter blade-operating lever in a direction for closing the shutter blades quickly free of the retarding of the retarder when the electromagnet is de-energized by the control circuit after termination of an exposure, the exposure time of which is determined automatically as a function of the brightness of the field or object being photographed.

10 Claims, 3 Drawing Figures

3,722,392

PATENTED MAR 27 1973

CAMERA SHUTTER WITH NOVEL OPERATING MECHANISM

BACKGROUND OF THE INVENTION

The present invention relates generally to cameras and more particularly to a new and improved shutter.

DESCRIPTION OF PRIOR ART

Electric shutters are known in which the opening of the shutter blades is retarded by a retarder mechanism and the blades are rapidly actuated to close the shutters subsequent to an exposure whose exposure time corresponds to a time which takes into consideration the brightness of the subject or field being photographed. In these known camera shutters a second electromagnet or a second power source is required for effecting the rapid closing of the shutter. This means that additional electrical elements are required sometimes even two additional electrical power sources which complicates the construction and results in a much larger shutter having to be constructed.

SUMMARY OF THE INVENTION

It is a principal object of the present invention to provide a shutter in which the opening thereof is retarded by a retarding mechanism and rapid closing of the shutter is effected with a simple shutter blade-operating mechanism.

In accordance with the invention a camera shutter is provided and controlled by a control circuit which controls the exposure time of the camera shutter. The shutter blades are operated by a pivotally mounted shutter blade-operating lever which is driven by a driving lever pivotally mounted on the operating lever intermediate between the opposite extreme ends of the operating lever. The driving lever is driven by a drive spring and is provided at one end with a sector gear which engages a gear of a retarding mechanism of which a part constitutes an escapement constituting a pinion meshing with the retardation gear and driving an escape gear cooperating with an anchor. The escapement gear is held in stationary position by a pawl which is released manually by a release lever or button actuated for effecting an exposure.

A pawl is provided in the shutter which has an attractable portion attracted by an electromagnet of the control circuit. When the power switch of the control circuit is closed the electromagnet is energized and the pawl is actuated to a stop position restraining movement of a free end of the driving lever during a part of a period of rotation of the driving lever when driving the blade-operating lever in a direction for opening the shutter blades. This restraint is released for release of the driving lever in conjunction with the drive means for quickly driving the operating lever in an opposite direction to rapidly effect closing of the shutter blades when the electromagnet is de-energized at the conclusion of the automatically determined exposure time which is a function of the brightness of the object or field being photographed and determined in a conventional manner by the control circuit.

BRIEF DESCRIPTION OF THE DRAWINGS

Other objects and advantages will appear from the following description of an example of the invention and the novel features will be particularly pointed out in the appended claims and specification in conjunction with the drawings in which:

DESCRIPTION OF THE PREFERRED EMBODIMENTS

Figure 1:
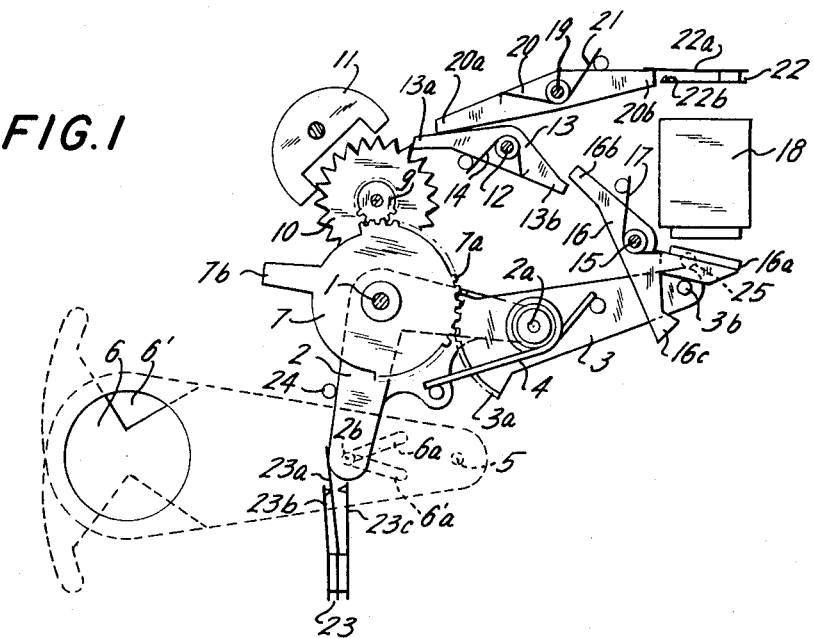
FIG. 1 is a diagrammatic elevation view of a shutter provided with the invention illustrating the shutter in a cocked condition.

In accordance with the drawings a shutter embodying the invention is provided with a pivot 1 pivotally mounting a shutter blade-operating lever 2 having two arms and on one of which is mounted a pivot 2a for pivotally mounting a driving lever 3 having on one end thereof a sector gear 3a and the opposite end of which is free and is provided with a stop pin 3b functioning as hereinafter described. The driving lever 3 is biased in a clockwise direction by a drive or operating spring 4. A pivot 5 is provided for pivotally mounting shutter blades 6, 6' provided with cam grooves or slots 6a, 6a' in which an operating pin 2b of the operating lever 2 is engaged for actuating the shutter blades to an open position from the closed position illustrated in FIG. 1 and back to the closed position as hereinafter described.

The shutter is provided with a retarder mechanism comprising an escapement and a gear 7 having peripheral teeth 7a with which the sector gear of the driving lever meshes and with which a pinion 9, integral with an escape gear 10, also meshes. As part of the escapement a pivotally mounted anchor 11 is provided which jointly with the retarding gear 7 and the escape gear 10 forms the retarder mechanism. The escape gear 10 is held stationary by a pawl or locking lever 13 pivotally mounted on a pivot 12 and biased in a counter clockwise direction by a spring 14. The locking lever 13 is provided with an end 13a which is biased into engagement with the teeth of the escapement gear when the shutter is in a cocked condition as illustrated in FIG. 1.

Figure 3:
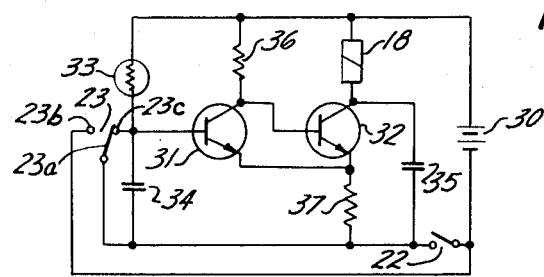
FIG. 3 is a schematic of a control circuit for controlling the shutter in FIGS. 1 and 2.

A pawl or stop lever 16 pivotally mounted on a pivot 15 is biased in a clockwise direction by a spring 17. The stop pawl 16 is provided with a lateral extension 16a which is held in a stop position by the stop pin 3b of the driving lever and is attractable by an electromagnet 18 of a control circuit illustrated in FIG. 3 as hereinafter described. A pawl portion 16c is provided for providing a stop and against which the stop pin 3b on the driving lever bears as hereinafter described. An opposite end 16b on the stop pawl 16 coacts with the locking lever 13 as later described.

A manually actuated release lever 20 is mounted on a pivot 19 and is biased in a counter clockwise direction by a spring 21. An end portion 20a bears on the locking lever 13 maintaining it engaged with the escape gear. An opposite end 20b maintains a resilient contact 22a separated from a contact 22b of an open power switch 22 of the control circuit which controls the exposure time of the shutter.

The control circuit is of the usual light-meter type in which a power source 30 has connected thereto a first stage transistor 31 and a second stage transistor 32 forming a trigger circuit. The first stage transistor 31 has its base connected to a stationary contact 23c of a change-over switch 23 provided with a movable contact 23a and another stationary contact 23b. A photoconductive device, constituting a CdS, 33, is connected to a junction between the base of the first stage transistor and the change-over switch 23 and is connected to the positive terminal of the power source and in series with a capacitor 34 connected to the opposite terminal through the power switch. The first stage transistor 31 has a collector connected to the positive terminal through a resistor 36 and to the base of the second stage transistor 32 which has its collector connected to the operating coil of the electromagnet 18 which is likewise connected to the positive terminal of the power source. The collector of the second stage transistor is connected through a capacitor 35 and through the power switch 22 to the negative terminal of the power source and the first stage transistor has its emitter connected to the same terminal through the power switch through a resistor 37. The series capacitor 34 in conjunction with the photoelectric or photoconductive device 33 functions in known manner to determine the exposure time of or period during which the shutter blades are in an open condition determined as a function of the brightness of the object of field being photographed.

When an exposure is taken the release lever 20 is actuated manually in a clockwise direction, when the release button of the camera, not shown, is manually depressed or actuated. This allows the release lever portion 20a to release the locking lever 13 and the power switch 22 to close. With the power switch closed the electromagnet 18 is energized and the emitter capacitor 35 causes a larger current flow to energize the electromagnet. The electromagnet when energized attracts the attractable portion of the stop pawl or lever 16 and rotates it in a clockwise direction so that its end 16b bears on the locking lever 13 and maintains it clear of the escape gear thereby releasing it. Its opposite pawl portion 16c moves upwardly providing a surface against which the stop pin 3b of the driving lever 3 rests and functions as hereinafter described.

Figure 2:
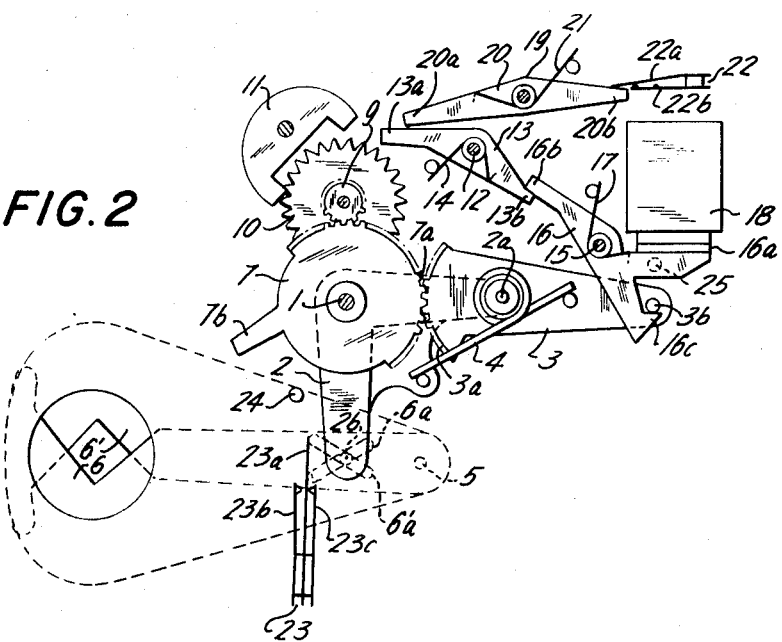
FIG. 2 is a diagrammatic elevation view of the shutter in FIG. 1 illustrating the shutter in an operating mode.

Since the driving lever 3 is biased in a clockwise direction the release of the escape gear allows the driving lever to rotate the retarder gear 7 in a counter clockwise direction and the pinion 9 is rotated in a clockwise direction so that the escape gear 10 vibrates the anchor 11. As the driving lever 3 rotates it drives the blade-operating lever in a counter clockwise direction so it commences the opening of the shutter blades as illustrated in FIG. 2 and in the position shown its stop pin 3b is engaged by the pawl 16c of the stop pawl 16 so that continued rotation of the rotation of the driving gear will open the shutter blades completely while the free end of the driving lever is restrained. In the position illustrated in FIG. 2 of the components of the shutter the shutter blades are illustrated partly open and as the driving lever continues to rotate in a clockwise direction under control of its driven spring a projection 7b on the retarder gear 7 engages a stop pin 24 when the shutter blades are fully open. The opening of the shutter blades is retarded by the retarder mechanism, comprising the retarder gear 7, pinion 9, escape gear 10 and the anchor 11, throughout the opening movement.

As illustrated in FIG. 1 the change-over switch has its movable contact 23a in contact with the stationary contact 23b when the shutter is a cocked condition and as the blade-operating lever is moved by the driving lever in a counter clockwise direction the change-over switch shifts to effect a contact change and have the movable contact 23a engaged with the other stationary contact 23b. As the change-over switch shifts the series capacitor 34 will charge as a function of the change in resistance in the photoconductive element 33 whose resistance varies proportionately to the brightness of the light sensed by it from the field or object being photographed. When the voltage charge of the capacitor exceeds the trigger level of the first stage transistor 31 of the trigger circuit the transistor will be rendered non-conductive to cut-off current supply to the electromagnet 18. When the electromagnet 18 is de-energized the driving lever pin 3b moves rapidly in a clockwise direction due to the force of drive spring 4 so that the shutter blade-operating lever 2 turns clockwise rapidly to quickly close the shutter blades 6 and 6'.

The shutter is restored to a cocked condition manually by manually controlled means, not shown, on the camera by which the retarder gear 7 is rotated in a clockwise direction until the free end of the driving lever 3 makes contact with a fixed pin 25 in the manner illustrated in FIG. 1. The camera is then placed in condition and readiness for taking another exposure.

Thus it can be seen that the opening of the shutter blades takes place under a retarded control of the retarder mechanism the exposure time during which the shutter blades is open is controlled by the control circuit and when the electromagnet is de-energized the force applied thereto by its drive spring 4 will rotate the operating lever rapidly in a direction for rapidly closing the shutter blades.

In the embodiment illustrated the shutter release is performed by an electromagnet 18 at the termination of the exposure time, however, this can be accomplished by well known mechanical means, not shown. The cocking can take place, moreover, by rotating the escape gear 10 counter clockwise by suitable means.

Those skilled in the art will understand that the controlled retarded opening of the shutter and rapid closing thereof according to the invention is accomplished by a single power source and a simplified operating mechanism construction which minimized the shutter size as compared with conventional electronic shutters of this type.

What I claim and desire to secure by Letters Patent is:

1. In a camera shutter, in combination, shutter blades operable from a closed position closing an exposure aperture to an open position opening said exposure aperture and back to said closed position, a pivotally mounted shutter blade-operating lever for operating said shutter blades from said closed position to said open position and back to said closed position, a driving lever pivotally mounted on said blade-operating lever and pivotally driving said blade-operating lever, a retarding mechanism cooperative with said driving lever retarding opening of said shutter blades by said driving lever when opening said exposure aperture, said driving lever having one end driving said retarding mechanism and an opposite end free, drive means biasing said driving lever rotationally releasable locking means releasably maintaining said shutter blades closed when said shutter is in a cocked condition, manually operable release means to release said locking means to effect an exposure under control of said driving means and said retarding mechanism, and means movable to a position restraining movement of said free end of said driving lever during a part of a period of the rotation of said driving lever in driving the bladeoperating lever in a direction for opening the shutter blades under control of said drive means and releasing said free end of said driving lever for quick driving of the blade-operating lever in an opposite direction to rapidly effect closing of said shutter blades under control of said driving means thereby closing said shutter after a photographic exposure.

2. In a camera shutter according to claim 1, in which said retarding mechanism comprises a gear and an escapement driven by said gear, said driving lever having a gear sector meshing with said gear, and means pivotally mounting said gear and said operating lever coaxially.

3. In a camera shutter according to claim 2, in which said escapement comprises a pinion gear, an escape gear coaxial and integral with said pinion gear, and pivotally mounted anchor cooperative with said escape gear, and said locking means comprising a pawl releasably holding said escape gear from rotation.

4. In a camera shutter according to claim one in which said drive means comprises a drive spring.

5. In combination, a camera shutter and a control circuit for controlling exposure time of said camera shutter, said camera shutter comprising, shutter blades operable from a closed position closing an exposure aperture to an open position opening said exposure aperture and back to said closed position, a pivotally mounted shutter blade-operating lever for operating said shutter blades from said closed position to said open position and back to said closed position, a driving lever pivotally mounted on said blade-operating lever for pivotally driving said blade-operating lever, means pivotally mounting said driving lever on said blade-operating lever between opposite extreme ends of said blade-operating lever, a retarding mechanism cooperative with said driving lever retarding opening of said shutter blades by said driving lever and said blade-operating lever when opening said exposure aperture, said driving lever having means driving said retarding mechanism and an end free, drive means biasing said driving lever rotationally in a direction for effecting opening of said exposure aperture, locking means releasably locking said retarding mechanism in a stationary condition when said shutter is in a cocked condition, manually operable release means to release said locking means to effect an exposure, and stop means operable under control of said control circuit to a position restraining movement of said free end of said driving lever during a part of a period of rotation of said driving lever in driving the bladeoperating lever in a direction for opening the shutter blades in conjunction with said drive means and releasing said free end of said driving lever for quick driving of the blade-operating lever in an opposite direction under control of said driving means to rapidly effect closing of said shutter blades closing said shutter after termination of said exposure time, and means in said control circuit to release the stop means after an exposure time controlled by said control circuit thereby to release said free end of said operating lever to allow said rotation in said opposite direction.

6. The combination according to claim 5, in which said control circuit comprises an electromagnet to attract and hold said stop means in said position restraining movement of said free end of said blade-operating lever, and means in said control circuit to automatically determine exposure time as a function of the brightness of the light of a field being photographed and de-energize said electromagnet at the termination of said exposure time to release said stop means thereby to release said free end of said operating lever.

7. The combination according to claim 5, in which retarding means comprises a gear, said driving lever having a gear sector meshing with said gear, a pinion driven by said gear, an escape gear driven by said pinion, a pivotally mounted anchor cooperative with said escape gear, and said locking means being disposed for releasably locking said escape gear.

8. The combination according to claim 5, in which said drive means comprises a driving spring.

9. The combination according to claim 5, in which said stop means comprises a stop lever pivotally mounted and having a pawl for releasably holding said free end from rotating during said part of said period, and means on said stop lever attractable by said electromagnet when energized and releasable thereby when de-energized.

10. In a camera shutter having shutter blades operable from a closed position to an open position and back to the closed position opening and closing an exposure aperture, the improvement which comprises a shutter blade-operating mechanism comprising, a mechanical retarder for retarding opening of the blades, a driving lever driving the retarder for retarder opening of the blades during opening thereof, a shutter blade-operating lever opening and closing the shutter, and releasable stop means cooperative with the driving lever during movement of the driving lever applied to said blade-operating lever through said driving lever in a direction for opening the blades and unrelated with said driving lever during movement of said driving lever applied to said blade operating lever through said driving lever in a direction for closing said blades by quickly actuating said blade-operating lever at termination of the exposure time period.

* * * * *